(12) United States Patent
Kim et al.

(10) Patent No.: US 8,549,302 B2
(45) Date of Patent: Oct. 1, 2013

(54) DOWNLOADABLE CONDITIONAL ACCESS SYSTEM, CHANNEL SETTING METHOD AND MESSAGE STRUCTURE FOR 2-WAY COMMUNICATION BETWEEN TERMINAL AND AUTHENTICATION SERVER IN THE DOWNLOADABLE CONDITIONAL ACCESS SYSTEM

(75) Inventors: Soon Choul Kim, Daejeon (KR); O Hyung Kwon, Daejeon (KR); Soo In Lee, Deajeon (KR)

(73) Assignee: Electronics and Telecommunications Research Institute (KR)

( * ) Notice: Subject to any disclaimer, the term of this patent is extended or adjusted under 35 U.S.C. 154(b) by 1066 days.

(21) Appl. No.: 12/551,453

(22) Filed: Aug. 31, 2009

(65) Prior Publication Data

US 2010/0125733 A1    May 20, 2010

(30) Foreign Application Priority Data

Nov. 18, 2008    (KR) .......................... 10-2008-0114745

(51) Int. Cl.
*H04L 9/32* (2006.01)

(52) U.S. Cl.
USPC .......................................... 713/176; 709/228

(58) Field of Classification Search
USPC ............. 726/3; 713/169, 173, 176, 160–162, 713/170, 180; 709/223, 228
See application file for complete search history.

(56) References Cited

U.S. PATENT DOCUMENTS

| | | | | |
|---|---|---|---|---|
| 6,049,872 | A * | 4/2000 | Reiter et al. | 713/157 |
| 6,092,201 | A * | 7/2000 | Turnbull et al. | 726/4 |
| 6,385,317 | B1 | 5/2002 | Rix et al. | |
| 6,526,508 | B2 | 2/2003 | Akins, III et al. | |
| 7,443,986 | B2 * | 10/2008 | Takata et al. | 380/279 |
| 2009/0235352 | A1 * | 9/2009 | Schrijen et al. | 726/18 |
| 2010/0287038 | A1 * | 11/2010 | Copejans | 705/13 |

FOREIGN PATENT DOCUMENTS

| | | |
|---|---|---|
| KR | 10-2003-0052510 | 6/2003 |
| KR | 10-2006-0039284 A | 5/2006 |
| KR | 10-2006-0111824 A | 10/2006 |
| KR | 10-2007-0029627 | 3/2007 |

* cited by examiner

*Primary Examiner* — Beemnet Dada
(74) *Attorney, Agent, or Firm* — Blakely Sokoloff Taylor & Zafman

(57) ABSTRACT

Provided are a Downloadable Conditional Access System (DCAS), and a channel setting method and a message format for a 2-way communication between a terminal and an authentication server in the DCAS. The DCAS may include: a verification unit to verify an electronic signature and an integrity with respect to a message received from the authentication server; an extraction unit to extract network access information of the authentication server from the message in which the electronic signature and the integrity are verified; and a channel setting unit to set a communication channel with the authentication server based on the extracted network access information.

18 Claims, 7 Drawing Sheets

| Fields | Length (bytes) | Description | |
|---|---|---|---|
| Connection Type | 1 | TCP or UDP | TCP : 0x04<br>UDP : 0x05 |
| Host Port | 2 | Port Number | 6669 |
| Address Type | 1 | Address Type | IPv4 : 0x2<br>IPv6 : 0x3 |
| Server Host Address | 4 or 16 | IP Address of Authentication Server | 129.254.140.211 |
| Total Length | 8 or 20 | | |

410 — Connection Type
420 — Host Port
430 — Address Type
440 — Server Host Address
450 — Total Length

DOWNLOADABLE CONDITIONAL ACCESS SYSTEM, CHANNEL SETTING METHOD AND MESSAGE STRUCTURE FOR 2-WAY COMMUNICATION BETWEEN TERMINAL AND AUTHENTICATION SERVER IN THE DOWNLOADABLE CONDITIONAL ACCESS SYSTEM

CROSS-REFERENCE TO RELATED APPLICATION

This application claims the benefit of Korean Patent Application No. 10-2008-0114745, filed on Nov. 18, 2008, in the Korean Intellectual Property Office, the disclosure of which is incorporated herein by reference.

BACKGROUND

1. Field of the Invention

Embodiments of the present invention relate to a Downloadable Conditional Access System (DCAS).

2. Description of the Related Art

Currently, cable network providers providing cable broadcasting channel services are studying a scheme that may help a flexible operation of a Conditional Access System (CAS) and may also effectively reduce a time and costs used for a terminal distribution, a repair and maintenance, a customer support, and the like. Accordingly, they are paying great attentions on a Downloadable CAS (DCAS).

The DCAS aims at an online mutual authentication and a software-based safe secure micro (SM) client download. The DCAS may provide services in substitution of procedures that are performed offline when using an existing CAS. Accordingly, there is a need for a DCAS that may overcome disadvantages that may be caused by the online mutual authentication and by adopting a software transmission scheme instead of an existing offline CAS smart card and may also improve an efficiency.

SUMMARY

An aspect of the present invention provides a Downloadable Conditional Access System (DCAS) that may include network access information of an authentication server in a DCAS protocol message that is broadcast from the authentication server to a terminal and thereby allows the terminal to obtain secure and accurate network access information of the authentication server that the terminal desires to set a communication channel with.

Another aspect of the present invention also provides a DCAS that may construct a data format of network access information of an authentication server, included in a DCAS protocol message, using minimum information required for a Transmission Control Protocol (TCP)/Internet Protocol (IP) socket communication and thereby may reduce a traffic load in a network and may also improve a message processing performance in a terminal.

Another aspect of the present invention also provides a DCAS that may dynamically construct a port number, that is, a communication channel port in a DCAS protocol message broadcast by an authentication server and thereby may automatically allocate a particular communication port to a particular terminal.

Another aspect of the present invention also provides a DCAS that may perform setting and canceling of a mutual communication channel through an internal process of a DCAS protocol message and thereby may set a terminal environment without a need of a user intervention.

The present invention is not limited to the above purposes and other purposes not described herein will be apparent to those of skill in the art from the following description.

According to an aspect of the present invention, there is provided a DCAS including: a verification unit to verify an electronic signature and an integrity with respect to a message received from an authentication server; an extraction unit to extract network access information of the authentication server from the message in which the electronic signature and the integrity are verified; and a channel setting unit to set a communication channel with the authentication server based on the extracted network access information.

According to another aspect of the present invention, there is provided a DCAS including: a message transmitter to include network access information in a message and to thereby transmit the message; and a channel setting unit to set a communication channel with a terminal receiving the message, based on the network access information, when the network access information is received from the terminal.

According to still another aspect of the present invention, there is provided a channel setting method for a 2-way communication between a terminal and an authentication server in a DCAS, the method including: receiving a message from the authentication server to verify an electronic signature and an integrity; extracting network access information of the authentication server from the message in which the verified electronic signature and the integrity are verified; and setting a communication channel with the authentication server based on the extracted network access information.

According to yet another aspect of the present invention, there is provided a channel setting method for a 2-way communication between a terminal and an authentication server in a DCAS, the method including: including network access information in a message to transmit the message; and setting a communication channel with a terminal receiving the channel, based on the network access information, when the network access information is received from the terminal.

Additional aspects, features, and/or advantages of the invention will be set forth in part in the description which follows and, in part, will be apparent from the description, or may be learned by practice of the invention.

EFFECT OF THE INVENTION

According to embodiments of the present invention, it is possible to include network access information of an authentication server in a Downloadable Conditional Access System (DCAS) protocol message that is broadcast from the authentication server to a terminal. Therefore, the terminal may obtain secure and accurate network access information of the authentication server that the terminal desires to set a communication channel with.

Also, according to embodiments of the present invention, it is possible to construct a data format of network access information of an authentication server, included in a DCAS protocol message, using minimum information required for a Transmission Control Protocol (TCP)/Internet Protocol (IP) socket communication. Therefore, it is possible to reduce a traffic load in a network and to improve a message processing performance in a terminal.

Also, according to embodiments of the present invention, it is possible to dynamically construct a port number, that is, a communication channel port in a DCAS protocol message broadcast by an authentication server. Therefore, it is possible to automatically allocate a particular communication port to a particular terminal.

Also, according to embodiments of the present invention, it is possible to perform setting and canceling of a mutual communication channel through an internal process of a DCAS protocol message. Therefore, it is possible to set a terminal environment without a need of a user intervention.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 4 illustrates a data format of network access information of FIG. 3;

DETAILED DESCRIPTION

Figure 1:
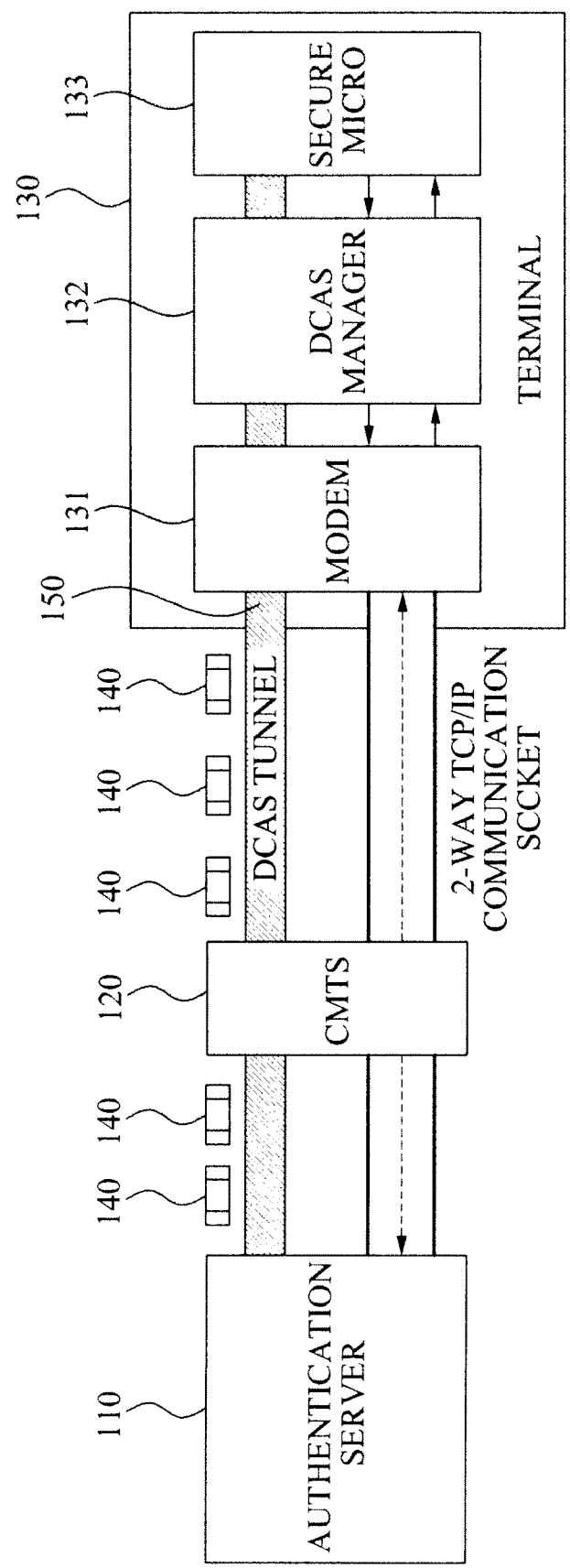
FIG. 1 illustrates network constituent elements of a Downloadable Conditional Access System (DCAS) according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 illustrates network constituent elements of a Downloadable Conditional Access System (DCAS) according to an embodiment of the present invention.

Referring to FIG. 1, the DCAS includes an authentication server 110, a Cable Modem Terminal System (CMTS) 120, and a terminal 130.

The authentication server 110 may transmit a SecurityAnnounce/DCASDownload message 140 to the CMTS 120 using a multicast address. Here, the CMTS 120 has a direct interface with the authentication server 110. The CMTS 120 may transfer, to a modem 131 of the terminal 130, the SecurityAnnounce/DCASDownload message 140 that is received via a pre-set DCAS tunnel 150.

The modem 131 may transfer the SecurityAnnounce/DCASDownload message 140, received via the DCAS tunnel 150, to a DCAS manager 132 included in a set-top box of the terminal 130. The DCAS manager 132 may transfer the SecurityAnnounce/DCASDownload message 140 to a secure micro 133.

After booting is completed, the terminal 130 may verify the SecurityAnnounce/DCASDownload message 140 transferred to the secure micro 133. Specifically, the secure micro 133 may perform a validity verification and a download software version check for the SecurityAnnounce/DCASDownload message 140. When a network access to the authentication server 110 is required, the secure micro 133 may include network access information required for setting a communication channel with the authentication server 110 and then send a network connection request to the DCAS manager 132. Here, the network access information may be safely pre-obtained based on information included in the SecurityAnnounce/DCASDownload message 140.

The DCAS manager 132 may perform an arbitration between the modem 131 and the secure micro 133. The modem 131 may substantially perform a network in the terminal 130. The DCAS manager 132 may transfer, to the modem 131, the network connection request received from the secure micro 133.

The modem 131 may open a Transmission Control Protocol (TCP)/Internet Protocol (IP) communication socket based on the network access information included in the network connection request. When a connection type is a TCP based on the network access information, the modem 131 may perform a TCP connection setting request and reply process to the authentication server 110 via the CMTS 120. When the connection type is a User Datagram Protocol (UDP) based on the network access information included in the network connection request, the modem 131 may generate an IP address and a port of the authentication server 110, an IP address of the modem 131, and a port of the terminal 130.

The modem 131 may reply a result associated with generating of the TCP or UDP communication socket to the DCAS manager 132. The DCAS manager 132 may transfer the result to the secure micro 133.

When a socket channel for the 2-way communication between the authentication server 110 and the terminal 130 is completely set through the above process, the authentication server 110 and the secure micro 1330 may transmit and receive the SecurityAnnounce/DCASDownload message 140 via the set socket channel.

Figure 2:
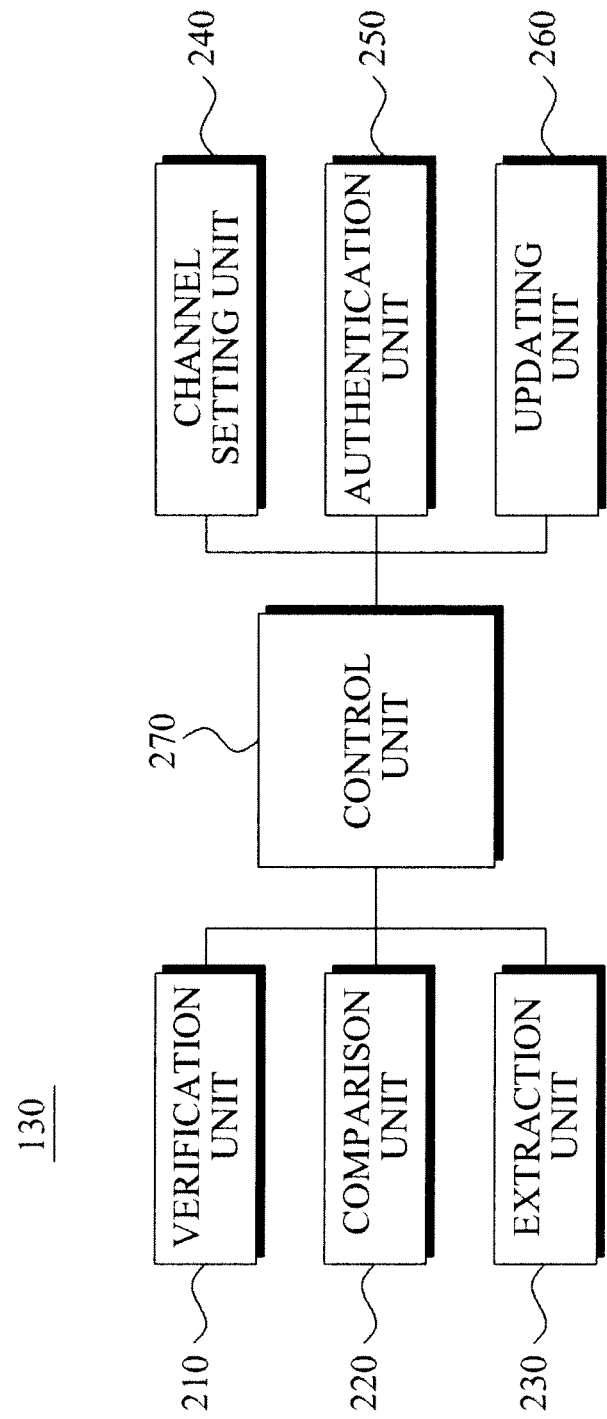
FIG. 2 is a block diagram illustrating a configuration of a terminal of FIG. 1.

FIG. 2 is a block diagram illustrating a configuration of the terminal 130 of FIG. 1.

Referring to FIG. 2, the terminal 130 may include a verification unit 210, a comparison unit 220, an extraction unit 230, a channel setting unit 240, an authentication unit 250, an updating unit 260, and a control unit 270.

The verification unit 210 may verify an electronic signature and an integrity with respect to a message received from an authentication server. The verification unit 210 may verify the electronic signature using a public key of the authentication server and a signature value included in the message. The verification unit 210 may verify the integrity for the message based on a verification result of the electronic signature.

Here, the message may be a DCAS protocol message and thus may include a SecurityAnnounce message or a DCASDownload message. The signature value is a value that is assigned using a private value of the authentication server and thus denotes a signed value with respect to a message content and header information in the message.

The comparison unit 220 may compare first software version information, included in the message in which the electronic signature and the integrity are verified, with second software version information of the terminal 130 and may determine whether to perform a download for software update depending on a comparison result. Specifically, when the first software version information is different from the second software version information, the comparison unit 220 may determine to perform the download. Conversely, when the first software version information is the same as the second software version information, the comparison unit 220 may determine not to perform the download.

When the comparison unit 220 determines to perform the download, the extraction unit 230 may extract network access information of the authentication server 110 from the message in which the electronic signature and the integrity are verified.

The channel setting unit 240 may set a communication channel with the authentication server based on the extracted network access information. Specifically, the channel setting unit 240 may request the authentication server to open a TCP/IP communication socket using the extracted network access information. Through a process of receiving a reply to the request, the channel setting unit 240 may set a communication channel, that is, a socket channel for a 2-way communication with the authentication server.

The authentication unit 250 may perform a mutual authentication with the authentication server via the communication channel.

The updating unit 260 may receive software download information from the authentication server via an encoded channel that is set by the mutual authentication and thereby update software.

The control unit 270 may control general operations of the verification unit 210, the comparison unit 220, the extraction unit 230, the channel setting unit 240, the authentication unit 250, the updating unit 260, and the like.

Figure 3:
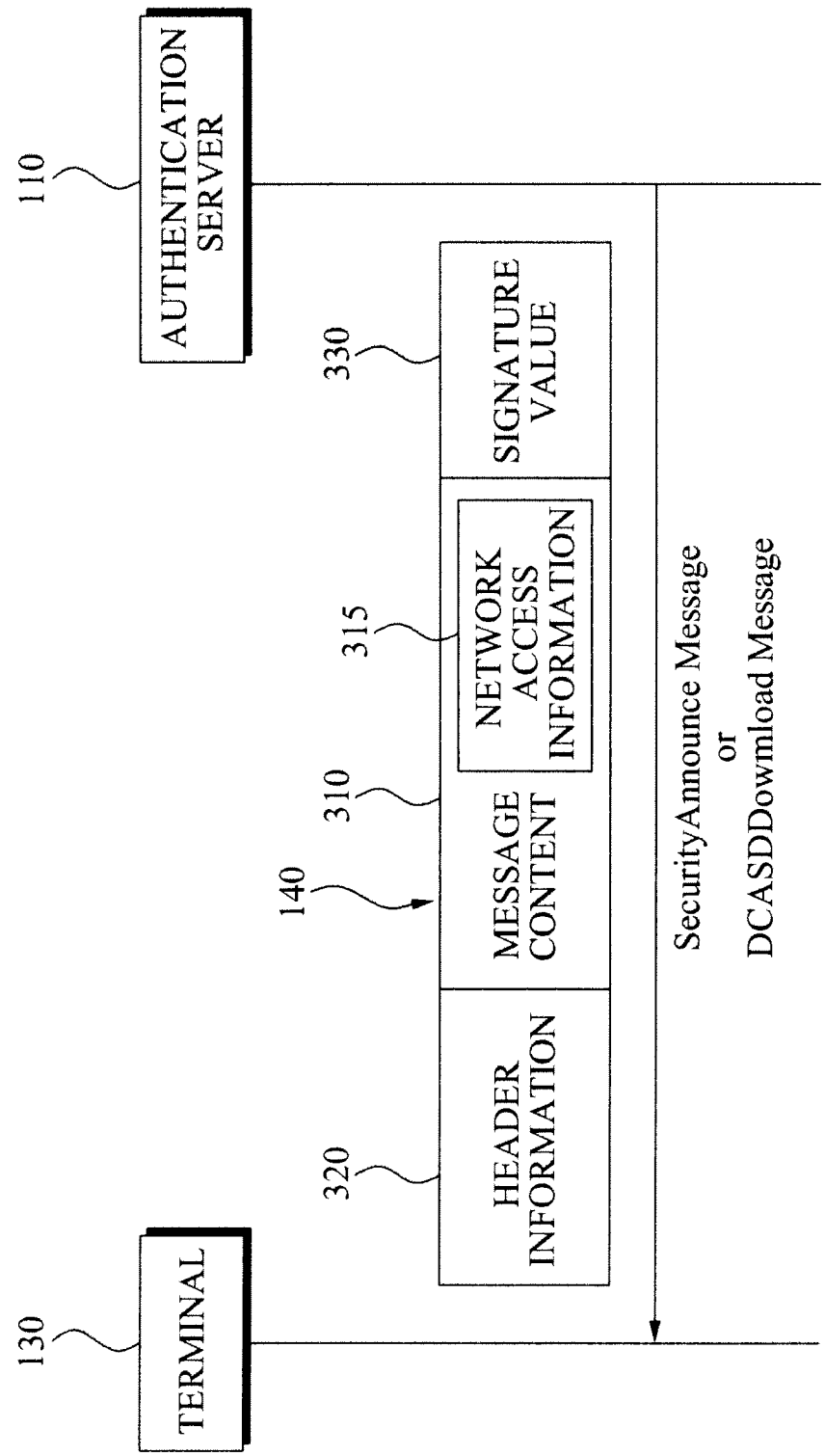
FIG. 3 is a diagram for describing a format of a SecurityAnnounce/DCASDownload message of FIG. 1.

FIG. 3 is a diagram for describing a format of the SecurityAnnounce/DCASDownload message 140 of FIG. 1.

Referring to FIG. 3, an authentication server 110 may transmit version information of software that may need to be downloaded and be installed and other information, to a particular terminal 130, or a portion of or all of terminals 130 that are connected to a cable network, using a SecurityAnnounce message or a DCASDownload message of a DCAS protocol message. Here, the format of the message transmitted from the authentication server 110 may include a data portion 310, a header portion 320, and a signature portion 330.

The data portion 310 may include a message content containing network access information 315 of the authentication server 110. The header portion 320 may include header information associated with the message content. The signature portion 330 may include a signature value associated with the message content and the header information. The signature value may be a value that is signed with a private key of the authentication server 110 with respect to the entire message, that is, the message content and the header information. The signature value may be used to verify the integrity with respect to all the DCAS protocol messages received at the terminal 130 and to trust only accurate information.

The authentication server 110 may include, in the message content, its network access information 315 together with other various types of information to be transmitted and then transmit the message to the terminal 130. The authentication server 110 may frequently vary the network access information 315 according to a software downloading policy, or a resource state and a security policy. The message, generated through the above process, may safely reach a secure micro of the terminal 130 without any change in the message, although the message passes through any network transmission layer. Accordingly, it may be difficult for the terminal 130 to find security vulnerability against a provider of the network access information 315 of the authentication server 110.

FIG. 4 illustrates a data format of the network access information 315 of FIG. 3, and shows examples of a field, a length, and a description.

A SecurityAnnounce message and a DCASDownload message including the network access information 315 may be periodically transmitted from an authentication server to a plurality of unspecific users. When the message length increases, it may cause a traffic load in a network, or may deteriorate a performance when a terminal processes the message. Accordingly, the SecurityAnnounce message and the DCASDownload message may be constructed to include only minimum information that is required for a TCP/IP socket communication between the terminal and the authentication server.

As shown in FIG. 4, the network access information 315 may have the data format that includes a connection type (TCP or UDP) 410, a host port (port number) 420, an address type 430, a server host address (IP address of the authentication server) 440, and a total length 450.

The connection type 410 indicates whether to use a TCP or a UDP as a lower transmission layer of the DCAS protocol message (SecurityAnnounce message/DCASDownload message). The host port 420 denotes a port number of the TCP or the UDP to be received at the authentication server. The address type 430 denotes an address system used at the authentication server and indicates whether the address system is Internet Protocol version 4 (IPv4) or IPv6.

The server host address 440 denotes a network address of the authentication server. The total length 450 denotes a total length of the message. When the server host address 440 is IPv4, the total length 450 may be 8 bytes. When the server host address 440 is IPv6, the total length 450 may be 20 bytes.

Figure 5:
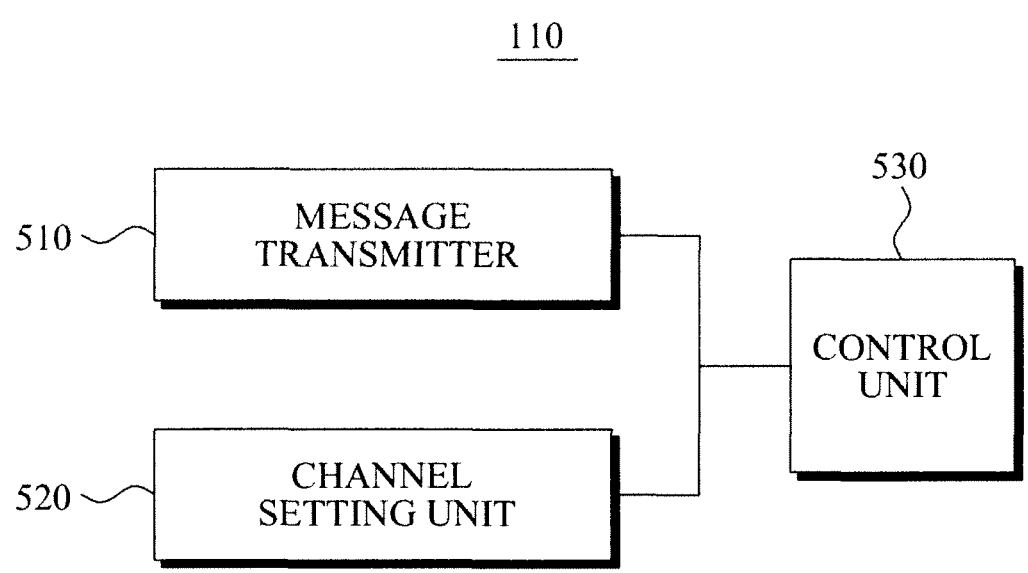
FIG. 5 is a block diagram illustrating a configuration of an authentication server of FIG. 1.

FIG. 5 is a block diagram illustrating a configuration of the authentication server 110 of FIG. 1.

Referring to FIG. 5, the authentication server 110 may include a message transmitter 510, a channel setting unit 520, and a control unit 530.

The message transmitter 510 may include network access information in a DCAS protocol message, that is, a SecurityAnnounce message or a DCASDownload message, and thereby transmit the DCAS protocol message. Here, the message transmitter 510 may include the network access information in a data portion (message content) of the DCAS protocol message and thereby transmit the DCAS protocol message. Also, the message transmitter 510 may include a signature value, signed with a private key, in the DCAS protocol message and thereby transmit the DCAS protocol message.

When the network access information is received from a terminal receiving the DCAS protocol message, the channel setting unit 520 may set a communication channel with the terminal based on the network access information. Specifically, the channel setting unit 520 may set the communication channel with the terminal based on a connection type, a port number, an address type, an IP address, and a total length that are included in the received network access information.

Figure 6:
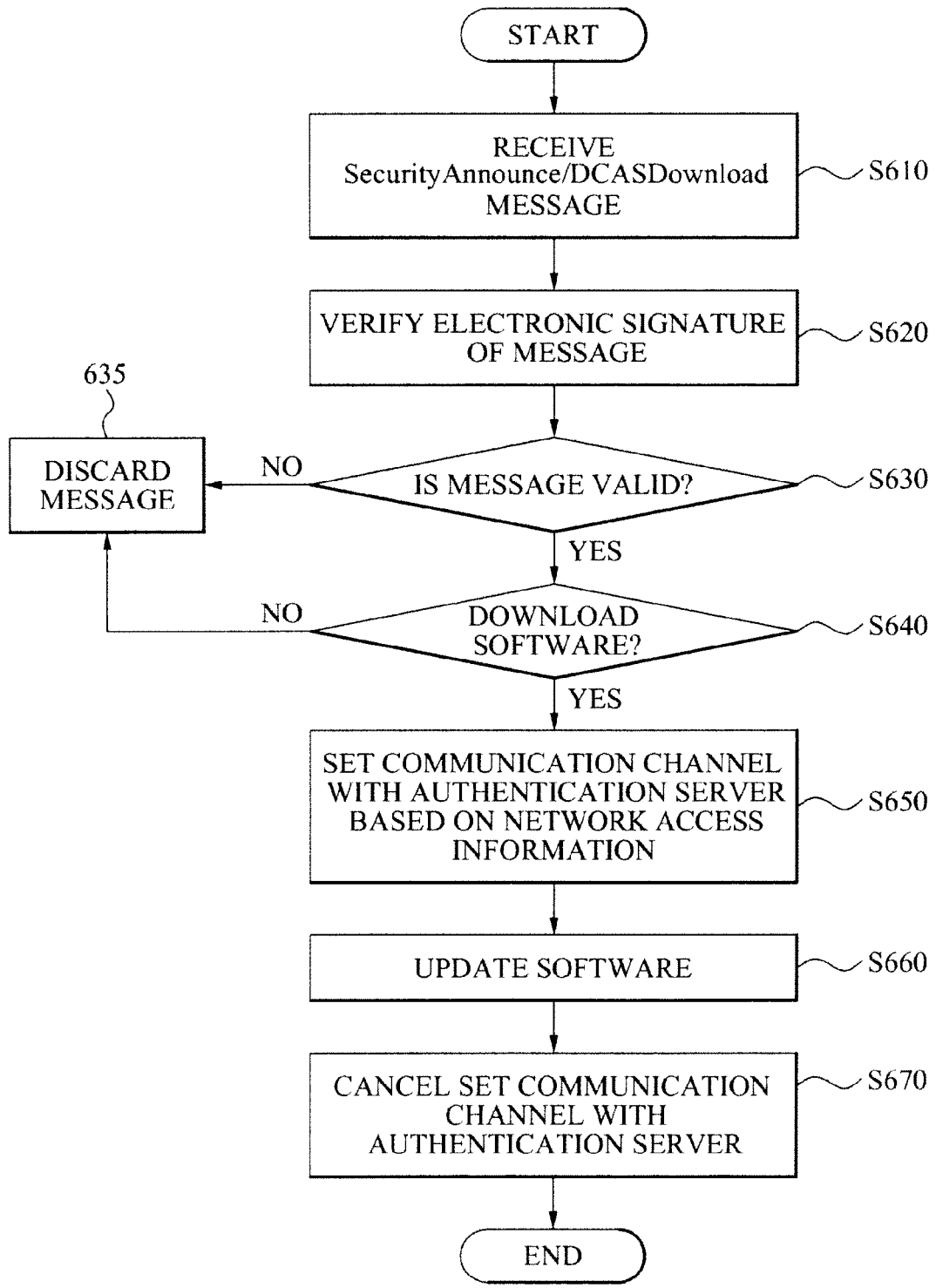
FIG. 6 is a flowchart illustrating a channel setting method for a 2-way communication between a terminal and an authentication server in a DCAS according to an embodiment of the present invention.

FIG. 6 is a flowchart illustrating a channel setting method for a 2-way communication between a terminal and an authentication server in a DCAS according to an embodiment of the present invention. The channel setting method may be performed by a terminal. The terminal may be constructed as the terminal 130 of FIG. 1.

Referring to FIG. 6, in operation S610, the terminal may receive a SecurityAnnounce/DCASDownload message.

In operation S620, the terminal may verify an electronic signature of the received message. Here, the terminal may verify the electronic signature using a public key of the authentication server and a signature value included in the message.

In operation S630, the terminal may determine whether the message in which the electronic signature is verified is valid. Specifically, the terminal may verify an integrity for the message in which the electronic signature is verified to thereby determine whether the message is valid.

When the message in which the electronic signature is verified is invalid, that is, a "no" direction in operation S630, the terminal may discard the message in operation S635. Conversely, when the message in which the electronic signature is verified is valid, that is, a "yes" direction in operation S630, the terminal may determine whether to download software in operation S640. For this, the terminal may compare first software version information included in the message in which the electronic signature and the integrity are verified, with second software version information of the terminal and thereby determine whether to perform the download for software update.

Specifically, when the first software version information is different from the second software version information, the terminal may determine to perform the download. Conversely, when the first software version information is the same as the second software version information, the terminal may determine not to perform the download.

In operation S650, the terminal may set a communication channel with the authentication server based on the network access information of the authentication server. Specifically, the terminal may request the authentication server to open a TCP/IP communication socket using the network access information. Through a process of receiving a reply to the request, the terminal may set a communication channel, that is, a socket channel for the 2-way communication with the authentication server. For this, when it is determined to perform the download, the terminal may extract the network access information from the message in which the electronic signature and the integrity are verified and thereby set the communication channel with the authentication server.

In operation S660, after performing a mutual authentication with the authentication server via the set communication channel, the terminal may receive software download information from the authentication server via an encoded channel that is set by the mutual authentication and thereby update software.

In operation S670, when updating of the software is completed by receiving all the software download information, the terminal may cancel the set communication channel with the authentication server.

Figure 7:
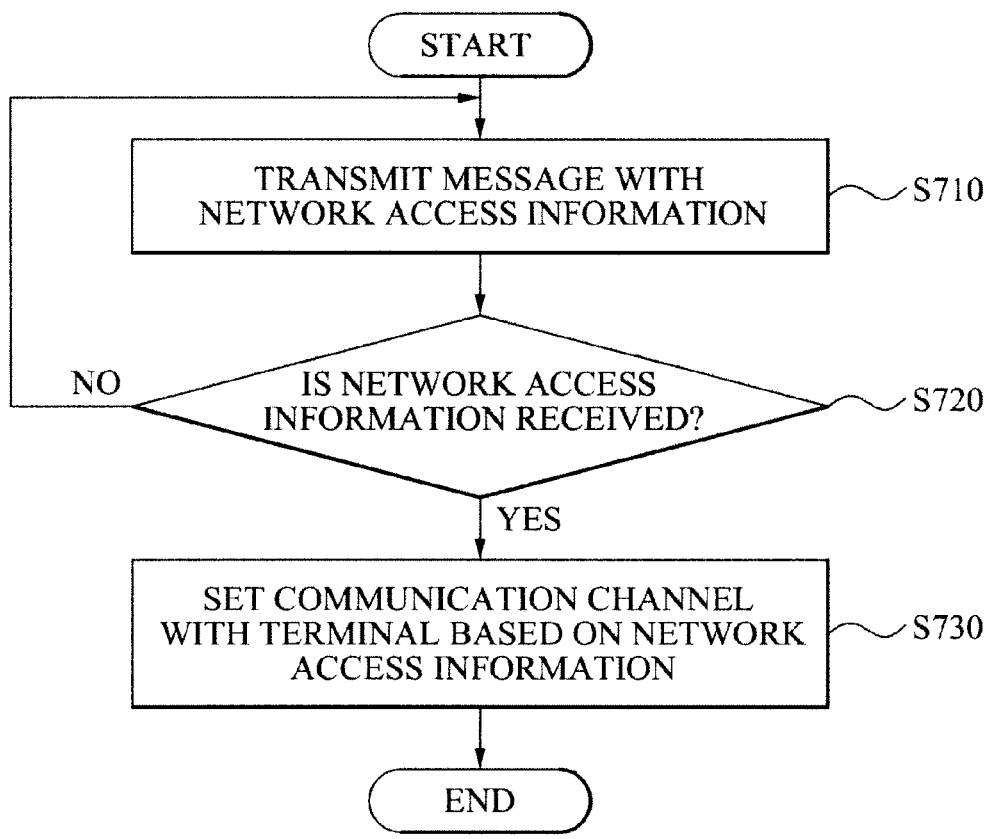
FIG. 7 is a flowchart illustrating a channel setting method for a 2-way communication between a terminal and an authentication server in a DCAS according to another embodiment of the present invention.

FIG. 7 is a flowchart illustrating a channel setting method for a 2-way communication between a terminal and an authentication server in a DCAS according to another embodiment of the present invention. The channel setting method may be performed by an authentication server. The authentication server may be constructed as the authentication server 110 of FIG. 1.

Referring to FIG. 7, in operation S710, the authentication server may include network access information in a DCAS protocol message, that is, a SecurityAnnounce message or a DCASDownload message, and thereby transmit the DCAS protocol message. Here, the authentication server may include the network access information in a data portion (message content) of the DCAS protocol message and thereby transmit the DCAS protocol message. Also, the authentication server may include a signature value, signed with a private key, in the DCAS protocol message and thereby transmit the DCAS protocol message.

In operation S720, the authentication server may verify whether the network access information is received from a terminal receiving the DCAS protocol message. When the network access information is not received, that is, a "no" direction in operation S720, the authentication server may perform again operation S710.

Conversely, when the network access information is received, that is, a "yes" direction in operation S720, the authentication server may set a communication channel with the terminal based on the network access information in operation S730. Specifically, the authentication server may set the communication channel with the terminal based on a connection type, a port number, an address type, an IP address, and a total length that are included in the network access information.

The channel setting method for the 2-way communication between the terminal and the authentication server in the DCAS according to the above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A Downloadable Conditional Access System (DCAS) comprising:
 a verification unit to verify an electronic signature and an integrity with respect to a message received from an authentication server;
 an extraction unit to extract network access information of the authentication server from the message in which the electronic signature and the integrity are verified; and
 a channel setting unit to set a communication channel with the authentication server based on the extracted network access information;
 wherein the channel setting unit sets the communication channel based on a connection type, a port number, an address type, an Internet Protocol (IP) address of the authentication server, and a total length that are comprised in the network access information.

2. The DCAS of claim 1, wherein the verification unit verifies the electronic signature using a public key of the authentication server and a signature value included in the message.

3. The DCAS of claim 1, wherein the verification unit verifies the integrity based on a verification result of the electronic signature.

4. The DCAS of claim 1, further comprising:
a comparison unit to compare first software version information, included in the message in which the electronic signature and the integrity are verified, with second software version information of a terminal and to determine whether to perform a download for software update depending on a comparison result,
wherein, when the comparison unit determines to perform the download, the extraction unit extracts the network access information of the authentication server from the message in which the electronic signature and the integrity are verified.

5. The DCAS of claim 4, wherein, when the first software version information is different from the second software version information, the comparison unit determines to perform the download.

6. The DCAS of claim 1, further comprising:
an authentication unit to perform a mutual authentication with the authentication server via the communication channel; and
an updating unit to receive software download information from the authentication server via an encoded channel that is set by the mutual authentication and to thereby update software.

7. A DCAS comprising:
a message transmitter to include network access information of a DCAS authentication server in a message and to thereby transmit the message; and
a channel setting unit to set a communication channel with a terminal receiving the message, based on a network access information of the terminal, when the network access information of the terminal is received from the terminal;
wherein the channel setting unit sets the communication channel with the terminal based on a connection type, a port number, an address type, an Internet Protocol (IP) address of the authentication server, and a total length that are comprised in the network access information of the DCAS authentication server.

8. The DCAS of claim 7, wherein the message transmitter includes the network access information in a data portion of the message to thereby transmit the message.

9. The DCAS of claim 7, wherein the message transmitter includes, in the message, a signature value assigned with a private key to thereby transmit the message.

10. A channel setting method for a 2-way communication between a terminal and an authentication server in a DCAS, the method comprising:
receiving a message from the authentication server to verify an electronic signature and an integrity;
extracting network access information of the authentication server from the message in which the electronic signature and the integrity are verified; and
setting a communication channel with the authentication server based on a connection type, a port number, an address type, an Internet Protocol (IP) address of the authentication server, and a total length that are comprised in the extracted network access information.

11. The method of claim 10, wherein the receiving and the verifying comprises verifying the electronic signature using a public key of the authentication server and a signature value included in the message.

12. The method of claim 10, wherein the receiving and the verifying comprises verifying the integrity based on a verification result of the electronic signature.

13. The method of claim 10, further comprising:
comparing first software version information, included in the message in which the electronic signature and the integrity are verified, with second software version information of a terminal to determine whether to perform a download for software update,
wherein, when it is determined to perform the download, the extracting comprises extracting the network access information of the authentication server from the message in which the electronic signature and the integrity are verified.

14. The method of claim 13, wherein the comparing and the determining comprises determining to perform the download when the first software version information is different from the second software version information.

15. The method of claim 10, further comprising:
performing a mutual authentication with the authentication server via the communication channel; and
receiving software download information from the authentication server via an encoded channel that is set by the mutual authentication to thereby update software.

16. A channel setting method for a 2-way communication between a terminal and an authentication server in a DCAS, the method comprising:
including network access information of the DCAS authentication server in a message to transmit the message; and
setting a communication channel with a terminal receiving the message, based on a network access information of the terminal, when the network access information of the terminal is received from the terminal; wherein the setting of the communication channel comprises: extracting a connection type, a port number, an address type, an IP address, and a total length from the network access information; and
setting the communication channel with the terminal based on the extracted connection type, the port number, the address type, the IP address, and the total length.

17. The method of claim 16, wherein the including of the network access message to transmit the message comprises including the network access information in a data portion of the message to thereby transmit the message.

18. The method of claim 16, wherein the including of the network access message to transmit the message comprises including, in the message, a signature value assigned with a private key to thereby transmit the message.

* * * * *